United States Patent
Arthur et al.

(10) Patent No.: US 7,452,499 B2
(45) Date of Patent: Nov. 18, 2008

(54) FURNACE COOLING SYSTEM AND METHOD

(75) Inventors: Mark Thomas Arthur, Franklin, TN (US); J. Michael Campbell, Hendersonville, TN (US); Troy D. Ward, Franklin, TN (US)

(73) Assignee: Systems Spray-Cooled, Inc., Nashville, TN (US)

( * ) Notice: Subject to any disclaimer, the term of this patent is extended or adjusted under 35 U.S.C. 154(b) by 568 days.

(21) Appl. No.: 10/976,689

(22) Filed: Oct. 29, 2004

(65) Prior Publication Data

US 2006/0091590 A1    May 4, 2006

(51) Int. Cl.
*C21C 1/00* (2006.01)
(52) U.S. Cl. .......................................... 266/241; 373/76
(58) Field of Classification Search ................. 266/241, 266/193, 194; 373/74, 76
See application file for complete search history.

(56) References Cited

U.S. PATENT DOCUMENTS

| | | | |
|---|---|---|---|
| 4,715,042 A | 12/1987 | Heggart et al. | 373/74 |
| 4,813,055 A | 3/1989 | Heggart et al. | 373/74 |
| 4,815,096 A | 3/1989 | Burwell | 373/74 |
| 4,849,987 A | 7/1989 | Miner, Jr. et al. | 373/74 |
| 5,290,016 A | 3/1994 | Elsner | |
| 5,653,936 A | 8/1997 | Enkner et al. | |
| 5,999,558 A * | 12/1999 | Miner et al. | 373/74 |
| 6,185,242 B1 | 2/2001 | Arthur et al. | 373/76 |

* cited by examiner

*Primary Examiner*—Scott Kastler
(74) *Attorney, Agent, or Firm*—Waddey & Patterson, P.C.; Phillip E. Walker

(57) ABSTRACT

A cooling system for the distribution and collection of a fluid coolant in a metallurgical vessel used in the processing of molten materials. The cooling system comprises a distribution system including an intake manifold, a plurality of headers attached to the intake manifold, and a plurality of distribution dispensers positioned along each header. A collection system, including a collection manifold, is positioned to collect the fluid coolant. The distribution dispensers are positioned to direct the fluid coolant towards the collection manifold and utilize the majority of the kinetic energy contained within the coolant to direct the coolant towards the collection manifold.

21 Claims, 8 Drawing Sheets

FURNACE COOLING SYSTEM AND METHOD

BACKGROUND OF THE INVENTION

1. Field of the Invention

The present invention relates generally to the improved cooling of metallurgical vessels used in the processing of molten materials. This invention finds particular application in conjunction with the spray cooling of the closure elements of roofs, sidewalls and hot gas ducts of metallurgical vessels used for processing molten materials. More particularly, but without limitation, this invention relates to the liquid spray cooling (i.e. water) of the thermally enhanced surfaces of furnace systems, including electric arc furnace systems.

2. Discussion of the Art

It will be appreciated by those skilled in the art that metallurgical vessels are used in the processing of molten materials to house the molten material at least during the heating step of the processing. These metallurgical vessels can process such molten materials as steel and slag. Also, these conventional metallurgical vessels include cooling systems used to regulate the temperature of the metallurgical vessels.

For example, furnace systems of the types disclosed in U.S. Pat. Nos. 4,715,042, 4,813,055, 4,815,096 and 4,849,987, which can be described as Spray-Cooled™ electric furnace systems, are types of these conventional metallurgical vessels (5). The Spray-Cooled™ systems use a fluid based coolant to spray cool the various surfaces, or closure elements, of the furnace in order to dissipate heat generated in the adjoining furnace during the material processing. These surfaces can be such closure elements as roofs and sidewalls. These surfaces are normally unitary, wherein the sidewalls include a generally cylindrical or oval shape and the roofs normally include a generally conical shape. The Spray-Cooled™ systems can be used to cool other components such as metal ducts used to transport heated gases from the furnace.

As seen in FIGS. 1-3a, a typical Spray-Cooled™ electric furnace vessel (5) as used for steel making is shown. FIGS. 1-3 illustrate in side, top and end views, respectively, of a Spray-Cooled™ electric arc furnace. The circular water-cooled furnace roof 10 is shown being supported by a furnace mast structure 14 in a slightly raised position directly over the rim 13 of an electric arc furnace base 12. As shown in FIGS. 1 and 2, the roof 10 is a unitary, or integral, one-piece closure component of frusto-conical shape which is attached by chains, cables or other roof lift members 53 to mast arms 18 and 20 which extend horizontally and spread outward from mast support 22. Mast support 22 is able to pivot around point 24 on the upper portion of vertical mast post 16 to swing roof 10 horizontally to the side to expose the open top of furnace base 12 during charging or loading of the furnace, and at other appropriate times during or after furnace operation.

Electrodes 15 are shown extending into opening 32 from a position above roof 10. During operation of the furnace, electrodes 15 are lowered through electrode ports of a delta opening 32 in the central roof into the furnace interior to provide the electric arc-generated heat to melt the charge. Exhaust port 19 permits removal of fumes generated from the furnace interior during operation.

The furnace system is mounted on stanchion, or trunnion type supports, positioned to allow the base 12 to be tilted in either direction to pour off slag and molten steel. The furnace roof system, as shown in FIGS. 1 and 2, is set up to be used as a left-handed system whereby the mast 14 may pick up the unitary, one-piece roof 10 and swing it horizontally in a counterclockwise manner (as viewed from above the system) clear of the furnace rim 13 to expose the furnace interior. Alternately, the furnace roof system can be set up as a right-handed system whereby the mast 14 may pick up the roof 10 and swing it horizontally in a clockwise manner.

To prevent excessive heat buildup on the lower metal surface 38 of roof 10 as it is exposed to the interior of base 12, a roof cooling system 98 is incorporated therein. A similar sidewall cooling system is shown at 100, and best seen in FIGS. 3 and 3a, for regulating the temperature of the furnace sidewall 138. The furnace sidewall 138 is in the form of a unitary, one-piece cylindrically shaped shell. Refractory liner 101, positioned below the sidewall cooling system 100, contains a body of molten material 103. The cooling systems 98 or 100 utilize a fluid coolant, such as water or some other suitable liquid, to cool the furnace roof, sidewall, or other closure element as the temperatures of the closure elements increase due to the heat generated from the molten material 103.

The cooling systems 98 and 100, which can be referred to as coolant circulation systems, comprise a coolant supply system and a coolant collection system, and may also include coolant re-circulation system. The coolant inlet pipe 26 and outlet pipes 28a and 28b comprise the coolant connections for the illustrated left-handed configured furnace roof 10. An external circulation system (not shown) utilizes coolant supply pipe 30 to supply coolant to coolant connection 26 and coolant drain pipes 36a and 36b to drain coolant from the coolant connections 28a and 28b of roof 10 as shown in FIGS. 1-3.

A flexible coolant supply hose 31 is attached to coolant supply pipe 30 and to coolant inlet pipe 26 on the periphery of furnace roof 10. This attachment is by a fastener, such as a quick release coupling. As shown best in FIG. 2, inlet 26 leads to an inlet manifold 29 which is positioned in the un-pressurized interior of roof 10. Alternately, the portion of the cooling system around the circumference of the vessel wall includes inlet manifold '29 which extends around furnace 13 as shown in FIG. 3a.

Branching radially outward from manifold 29 in a spoke-like pattern of pipes 33, or spray headers 33, positioned deliver the coolant to the various sections of the roof interior 23. Protruding downward from various points on each header 33 is a plurality of distribution dispenser 34, or spray nozzles 34, which direct coolant to the upper side of the lower roof panel 38, or inner plate 38. The spray nozzles 34 direct the fluid coolant to the lower roof panel 38 in a spray or fine droplet pattern. The lower panel 38 slopes gradually downwardly from center portion, or opening 32, of the roof to the periphery.

After being sprayed onto the lower roof panels 38, the spent coolant drains outwardly along the top of lower roof panels 38 and passes through drain inlets or openings 51a, 51b and 51c in a drain system. The drain system shown includes a drain manifold 49 which is made of rectangular cross section tubing, or the like, divided into segments 47a and 47b. A similar drain system (not shown) is provided for furnace base 12.

As seen in FIG. 2, drain openings 51a and 51b are on opposite sides of the roof. The drain manifold includes a closed channel extending around the interior of the roof periphery. The drain manifold is positioned near the lower level of the lower roof panels 38 and can be circumferentially separated by partitions or walls 48 and 50. The walls 48 and 50 separate the drain manifold into draining segments 47a and 47b. Drain manifold segment 47a connects drain openings 51a, 51b and 51c with coolant outlet pipe 28a. Drain manifold segment 47b is in full communication with segment 47a via pipe connector 44 and connects drain openings 51a, 51*b* and 51*c* with coolant outlet pipe 28*b*. Flexible coolant drain hose 37 connects outlet 28*a* to coolant drain pipe 36*a* while flexible coolant drain hose 35 connects outlet 28*b* and coolant drain pipe 36*b*. Quick release fasteners or other couplings may be used to connect the hoses and pipes. The coolant collection system can utilize pressure, such as a pump, to quickly and efficiently drain the discharged coolant from the roof 10 through coolant drain pipes 36*a* and 36*b*.

Additionally, a second set of coolant connections, which may be used as the main connections for a right-handed installation of roof 10, is provided. This second, or right-handed, set of coolant connections comprises coolant inlet 40 and coolant outlet 42. The left and right-handed coolant connections are on opposite sides of roof 10 relative to a line passing through mast pivot point 24 and the center of the roof 10, and lie in adjacent quadrants of the roof. As with the left-handed coolant inlet pipe 26, the right-handed coolant inlet pipe 40 is connected to inlet manifold 29. As with the left-handed coolant outlet 28, the right-handed coolant outlet 42 includes separate outlet pipes 42*a* and 42*b* which communicate with the separate segments 47*a* and 47*b* of the coolant drain manifold which are split by partition 50.

To prevent coolant from escaping through the right-handed coolant connections during installation of roof 10 in a left-handed system, the individual roof coolant inlets and outlets are seal or rerouted. For example, a removable cap 46 may be secured over the opening to coolant inlet 40 to seal the inlet 40. Additionally, a removable U-shaped conduit or pipe connector 44 connects and seals the separate coolant outlet openings 42*a* and 42*b* to prevent leakage from the roof. The pipe connector 44 also provides for continuity of flow between drain manifold segments 47*a* and 47*b* around partition 50. Where the draining coolant is under pressure, such as suction pressure, the pipe connector 44 and cap 46 also prevent atmospheric leakage into the drain manifold sections.

During operation of the roof as shown in FIGS. 1-3*a*, coolant would enter from the coolant circulation system through coolant pipe 30, hose 31, and into coolant inlet 26. Then, the coolant would be distributed around the interior of the roof by inlet manifold 29, spray headers 33, and nozzles 34. Coolant inlet 40, also connected to inlet manifold 29, is reserved for right-handed installation use and therefore would be sealed off by cap 46.

After coolant is sprayed from nozzles 34 on spray headers 33 to cool the roof bottom 38, the coolant is collected and received through drain openings 51*a*, 51*b* and 51*c* into the drain manifold extending around the periphery of the roof 10 and exits through coolant outlet 28. As seen in FIG. 2, coolant draining through openings 51*a*, 51*b* and 51*c* on segment 47*a* of the drain manifold may exit the roof directly through coolant outlet 28*a*, through outlet hose 37 and into drain outlet pipe 36*a* before being recovered by the coolant collection system.

Coolant draining through openings 51*a*, 51*b* and 51*c* on segment 47*a* of the drain manifold may also travel through coolant outlet 42*b*, through U-shaped connector 44, and back through coolant outlet 42*a* into manifold segment 47*b* in order to pass around partition 50. The coolant would then drain from drain manifold segment 47*b* through coolant outlet 28*b*, outlet hose 35 and through drain pipe 36*b* to the coolant collection means. Right-handed coolant outlet 42 is not utilized to directly drain coolant from the roof, but is made part of the draining circuit through the use of U-shaped connector 44. Upon being drained from the roof, the coolant may either be discharged elsewhere or may be re-circulated back into the roof by the coolant system. Left-handed coolant connections 26 and 28 are positioned on roof 10 closely adjacent to the location of mast structure 14 to minimize hose length. Viewing the mast structure 14 as being located at a 6 o'clock position, the left-handed coolant connection is located at a 7 to 8 o'clock position.

As previously noted, the various surfaces of the metallurgical vessels can be exposed to unusually high temperatures during the processing of the molten materials. In the operation of a furnace system as above described, these surfaces include the frusto-conically shaped metal roof inner plate 38 or the cylindrically shaped metal sidewall unitary closure element inner plate 138. These closure elements may be exposed to significantly increased amounts of radiant thermal energy, as indicated at 107, from the arc or flame within the furnace. This exposure normally occurs when the electrodes are positioned above a molten metal batch or when the electrodes begin to bore-in to a scrap charge 109.

This high temperature exposure can thermally stress these various regions and result in a risk of fatigue and failure at such regions, especially in reference to other regions of the metallurgical vessel. Additionally, due to the geometry of metallurgical vessels and the heating elements used in the process, such as electrodes and the accompanying oxygen lances, variations in the temperature of the surfaces of the furnace closure elements is common. As such, the hottest surface area of the roof of the metallurgical vessel is traditionally proximate to the central delta opening 32 of the roof 10.

These conditions result in higher temperatures and thermal stress at one site, or region, as compared to other portions thereof. This circumstance can occur due to the relative position of the furnace electrodes, oxygen lances, or other non-uniform furnace operating conditions.

In order to increase the useful life of the various portions of the metallurgical vessel, the prior art has developed cooling system as previously described. The conventional wisdom has been to focus the cooling effort of these cooling systems on the areas of increased temperature. Additionally, the conventional wisdom has been to supply more cooling fluid, or coolant, to the areas of increased temperature, or high heat load regions.

In the prior art as shown in FIG. 4, the coolant is directed straight at the region requiring the increased cooling. In the case of electric arc furnace roofs this region is often times the substantially vertical closure element which extends around the central delta opening 32 and the surrounding surfaces.

Conventionally, the inlet manifold 29 is positioned proximate to and extends around central delta opening 32 in the un-pressurized interior of roof 10. As such, the difficulty in directing the coolant to the high temperature areas is increased. This positioning of the inlet manifold 29 basically requires the spray nozzles to be positioned under the inlet manifold. Additionally, these conventional systems require the spray nozzles to be directed upward towards the delta opening 32.

In operation, the conventional cooling systems use gravity to drain the spent coolant down and out along the top of the lower roof panels 38 toward the collection systems. Conversely, the various nozzles specifically direct unspent, fresh, or new coolant up towards the opening and the surrounding surfaces. The result is the upwardly directed spraying of new coolant directly opposes the downward gravitational force being applied to the spent coolant. Also, since the force used to direct the new coolant upward opposes the gravitational pull on the spent coolant, the spent coolant tends to be maintained in the higher heat regions, or even pushed back upwards toward the higher heat regions.

As a result, the spent coolant increases in depth, or thickness, in the higher heat regions and retains the heat in the higher heat regions. Additionally, the new coolant cannot properly reach the higher heat regions due to the presence of the spent coolant. This increase in depth of the spent coolant over the higher heat regions combined with the inability of the new coolant to properly reach the higher heat regions significantly reduces the cooling capacity of the conventional cooling systems. As a result, the prior art attempts to cool the higher heat regions by directing coolant upward toward the higher heat regions has actually reduced the cooling capacity of these systems and failed to adequately cool the higher heat regions.

What is needed, then, is a cooling system for a metallurgical vessel that is designed to properly utilize the energy and geometry of the metallurgical vessel to increase the cooling capacity of the cooling system. This cooling system is currently lacking in the art.

SUMMARY OF THE INVENTION

Included herein is a cooling system for the distribution and collection of a fluid coolant in a metallurgical vessel used in the processing of molten materials. The cooling system comprises a distribution system including an intake manifold, a plurality of headers attached to the intake manifold, and a plurality of distribution dispensers positioned along each header. Also included is a collection system including a collection manifold positioned to collect the fluid coolant. The distribution dispensers are positioned to direct the fluid coolant towards the collection manifold and utilize the majority of the kinetic energy contained within the coolant to direct the coolant towards the collection manifold.

In a preferred embodiment first and second headers are attached on substantially opposite sides of the intake manifold and the second header is vertically positioned below the first header. The metallurgical vessel includes a high heat region and the intake manifold is spaced from the high heat region. The overall effect is such that the positioning of the majority of the distribution dispensers and the utilization of the majority of the kinetic energy contained within the coolant directs the previously discharged coolant towards the collection manifold.

Also included is a metallurgical vessel used in the processing of molten materials. The metallurgical vessel comprises an inner plate including an interior surface, an outer plate spaced from the inner plate and defining a substantially enclosed space, a distribution system, and a collection system. The inner plate, outer plate spaced, substantially enclosed space, distribution system, and collection system of the metallurgical vessel can comprise various portions of the metallurgical vessel, including but not limited to the top, sides, bottom, ducts, and the like.

The distribution system is positioned within the enclosed space to distribute a kinetically energized fluid coolant to the inner plate. The distribution system includes supply pipes for the transportation of the coolant. The supply pipes can include an intake manifold, a plurality of headers attached to the intake manifold, and a plurality of distribution dispensers positioned along each header. The intake manifold is positioned between a first and a second header and is positioned substantially in the middle of the enclosed space.

The collection system includes a collection manifold for the collection of the fluid coolant. The collection manifold is peripherally positioned around the distribution system and vertically positioned below a majority of the distribution system, while the inner surface slopes towards the collection manifold. The distribution dispensers are positioned towards the collection manifold to use a majority of the kinetic energy contained within the fluid coolant to direct the fluid coolant toward the collection manifold.

Preferably, a line of intersection extends between each distribution dispenser and the inner surface. The distribution dispensers are positioned to direct the fluid coolant to intersect the interior surface at an oblique angle along the line of intersection. The oblique angle is preferably an obtuse angle as measured from the line of intersection towards the collection manifold. Additionally, the distribution system distributes the fluid coolant against the inner plate at a quantity sufficient for maintaining the plate at a predetermined temperature.

Also included is a method of controlling a flow of fluid coolant from a dispensing point to a collection point to cool a thermally enhanced surface of a metallurgical vessel used in the processing of molten materials. The method comprises directing the fluid flow to strike the heated surface at an obtuse angle as measured in the direction of the collection point of the metallurgical vessel. Additionally, the method includes using a majority of the kinetic energy contained within the fluid coolant to direct previously dispensed fluid coolant towards a collection point.

Also included is a spray cooling system for an electric arc furnace containing molten material. The spray cooling system enables improved cooling protection at thermally stressed wall sections of various closure elements of the furnace. The spray cooling system sprays coolant towards the various wall sections to impact the wall sections while simultaneously utilizing the kinetic energy contained in the coolant to force the coolant away from the thermally stressed areas. This forced movement of the coolant reduces the buildup of undesirable spent coolant and maximizes the heat transfer coefficient between the inner surface and the coolant. The spray coolant is directed such that a majority of the available kinetic energy is directing the spent coolant towards the direction of a coolant discharge. More preferably the spray coolant is directed such that at least 70% of the available kinetic energy in the coolant is directed towards the coolant discharge. In the spray cooling system, portions of the transportation elements that carry the coolant are relocated away from the areas of increased thermal stress. Typically the coolant is directed away from the thermally stressed area at an angle preferably ranging between 20 degrees to 45 degrees from perpendicular with respect to the surface to which the coolant strikes.

It is therefore a general object of the present invention to provide an improved cooling system for a metallurgical vessel.

Another object of the present invention is to improve the cooling system of an electric arc furnace used to process molten metal.

Yet another object of the present invention is to improve the cooling of thermally stressed regions of a metallurgical vessel used in the processing of molten material.

Still another object of the present invention is to improve the cooling of a furnace by specifically controlling the angle of impact of a coolant to a heated surface in a metallurgical vessel.

And yet still another object of the present invention is to control the impact of a coolant to a surface in order to keep from building up spent coolant in a thermally stressed area.

Still yet another object of the present invention is to use the kinetic energy contained within a fluid to control the movement of that fluid.

Another object of the present invention is to minimize the buildup of spent coolant used during the cooling of a top of a metallurgical vessel used in the processing of molten material.

Another object of the present invention is to maximize the heat transfer coefficient between an inner surface and a coolant used to cool a metallurgical vessel containing molten material.

Other and further objects, features and advantages of the present invention will be readily apparent to those skilled in the art upon reading of the following disclosure when taken in conjunction with the accompanying drawings.

DETAILED DESCRIPTION OF THE PREFERRED EMBODIMENT

Figure 1:
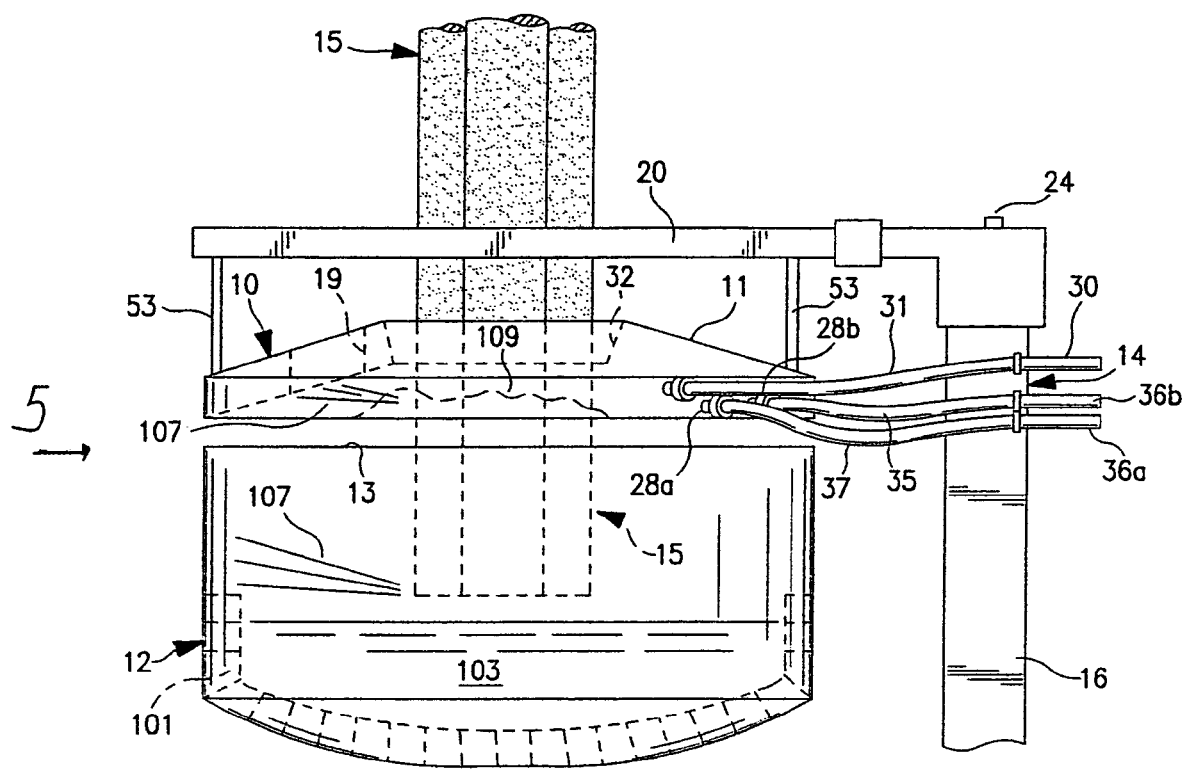
FIG. 1 is a side elevation view of a typical electric furnace installation showing a furnace vessel, a furnace roof in a raised position over the furnace vessel and a mast supporting structure for the roof.
Figure 2:
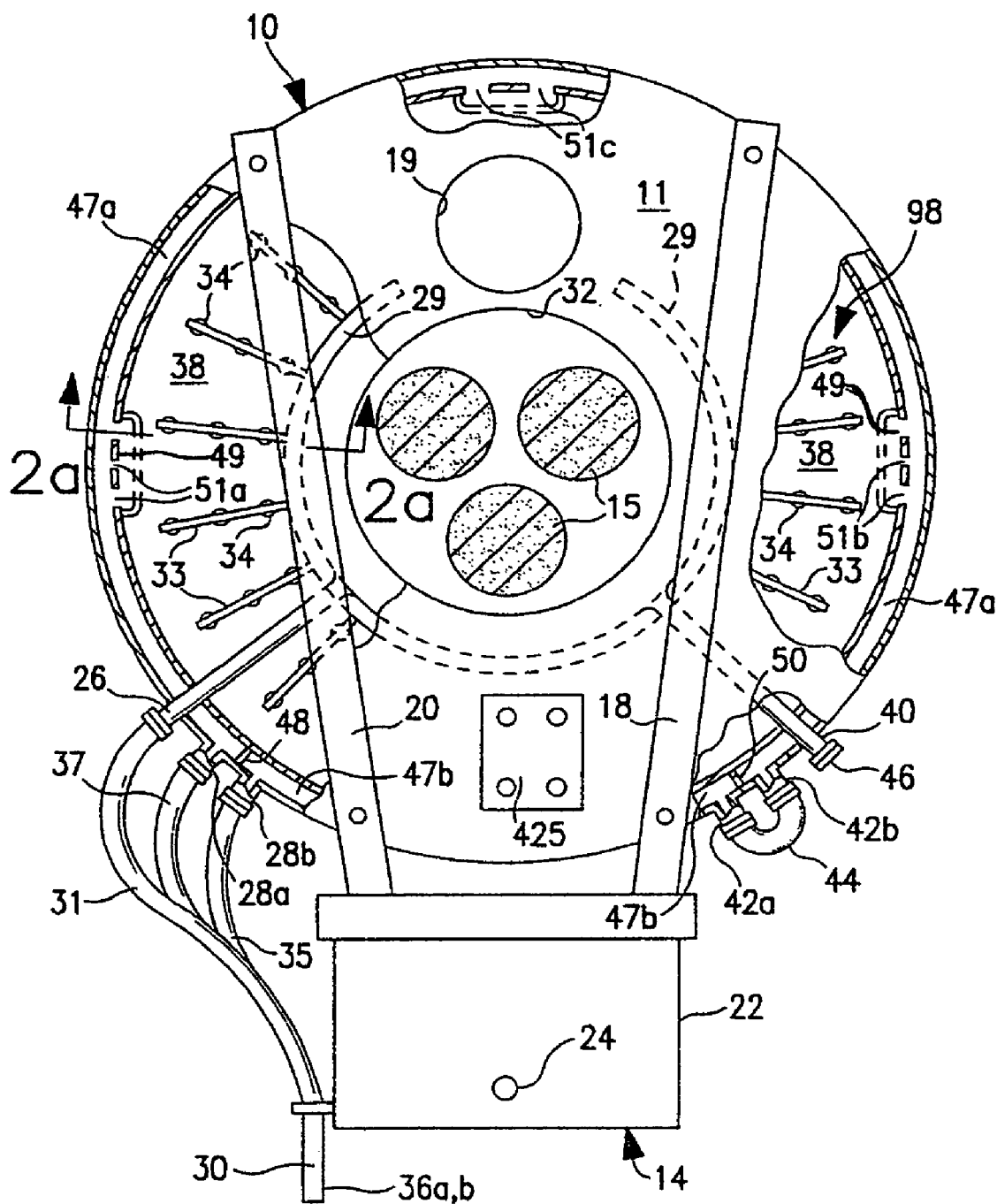
FIG. 2 is a top plan view, partially cut away and partially in section, of a Spray-Cooled™ furnace roof of FIG. 1.
Figure 3:
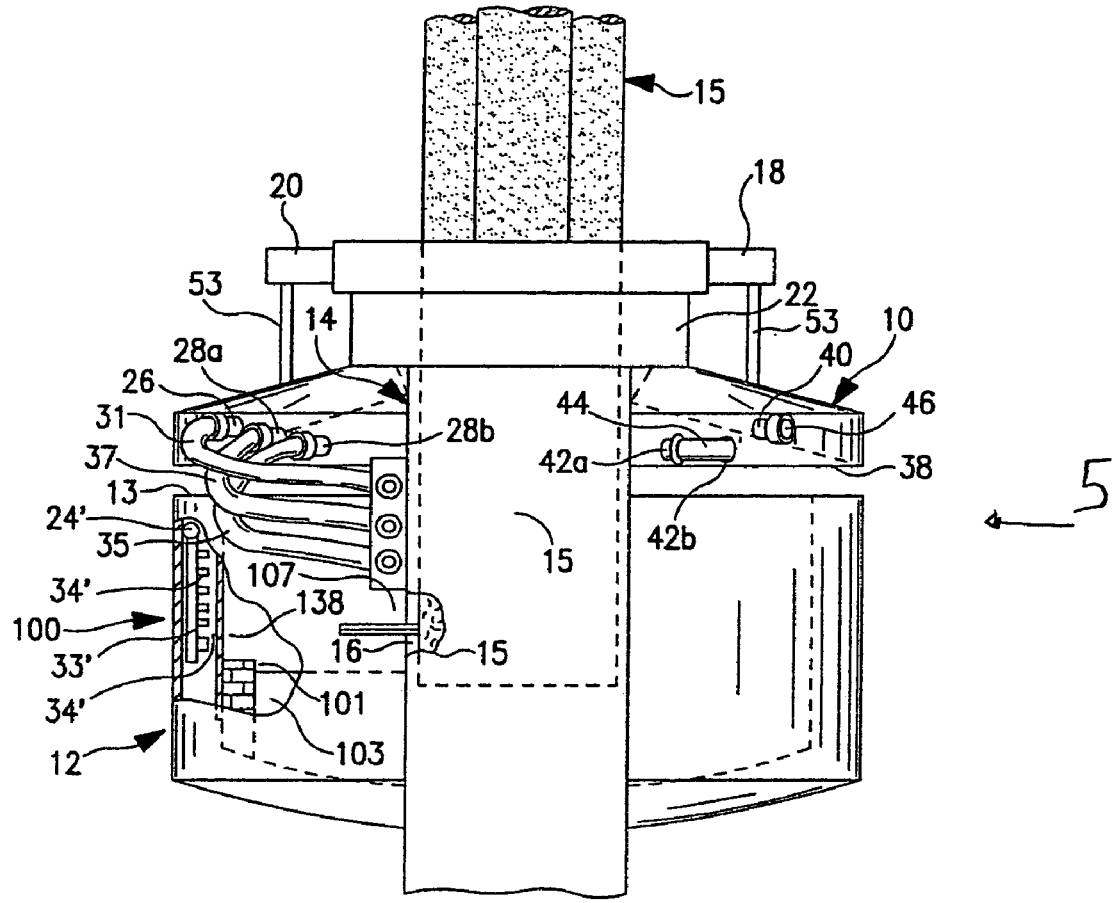
FIG. 3 is an end elevation view, partly in section, of the electric furnace installation of FIG. 1 also showing the refractory lined molten metal-containing portion of the furnace vessel and furnace side wall spray cooling components.
Figure 3A:
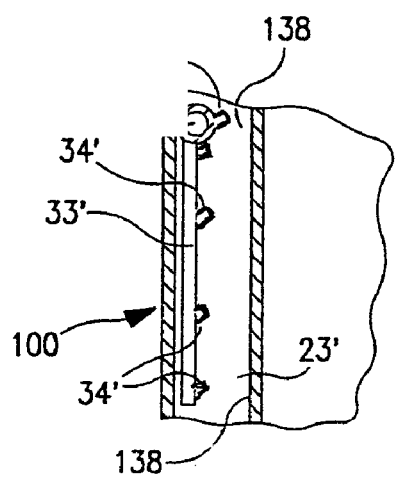
FIG. 3a is an enlarged partial view of the sectional portion of FIG. 3.

Referring now generally to FIGS. 5-8, a top for a metallurgical vessel used in the processing of molten materials is generally shown and designated by the numeral (201). The top is shown for illustrative purposes, but the principals of the inventive aspects of this disclosure on can be applied to other portions of a metallurgical vessel, such as sidewalls, ducts, or other area or section exposed to heat and desired to be cooled.

The top (201) comprises an inner plate (238) including an inner surface (239), an outer plate (211) spaced from the inner plate (238) to define a substantially enclosed space (205). The top (201) also comprises a cooling system (200) including a distribution system (204) and a collection system (206). The distribution system (204) is positioned within the enclosed space (205) to distribute kinetically energized fluid coolant (202) to the inner plate (238). The inner plate (238) can also be described as a lower plate (238) or a bottom plate (238), while the outer plate (211) can also be described as an upper plate (211).

The cooling system (200) is for the distribution and collection of fluid coolant (202) in a metallurgical vessel (5) used in the processing of molten materials. The cooling system comprises a distribution system (204) and a collection system (206). The distribution system (204) includes a plurality of supply pipes (208) and a plurality of distribution dispensers (210). The supply pipes (208) can include a plurality of headers, such as a first header (212) and a second header (214), attached to an intake manifold (216). The distribution dispensers (210) can be positioned along the supply pipes (208), and more specifically along the headers (212 and 214). The collection system (206) includes a collection manifold (218) positioned to collect the coolant (202). The distribution dispensers (210) are positioned to direct the coolant (202) towards the collection manifold (218) and utilize a majority of the kinetic energy contained within the coolant (202) to direct the coolant (202) towards the collection manifold (218). The distribution dispensers (210), which can also be described as spray nozzles (210), can also be described as being positioned towards the collection manifold (206) to use a majority of the kinetic energy contained within the coolant (202) to direct the coolant towards the collection manifold (218).

The positioning of the distribution dispensers (210) and the use of the majority of the kinetic energy contained within the coolant (202) directs previously discharged fluid coolant (203) towards the collection manifold (218). The distribution system (204) includes distribution dispensers (210) positioned to supply fluid coolant (202) to a high heat region (220), which can also be described as a higher temperature location (220). However, the distribution system (204) is configured to use the kinetic energy of the fluid coolant (202) to direct the fluid coolant (202) and the previously discharged fluid coolant (203) away from the high heat regions (220). As such the distribution system (204) is positioned to minimize the buildup of previously discharged coolant (203) and to maximize the heat transfer coefficient between the inner plate (238) and the coolant (202 and 203) in the facilitation of cooling the top (201).

Figure 5:
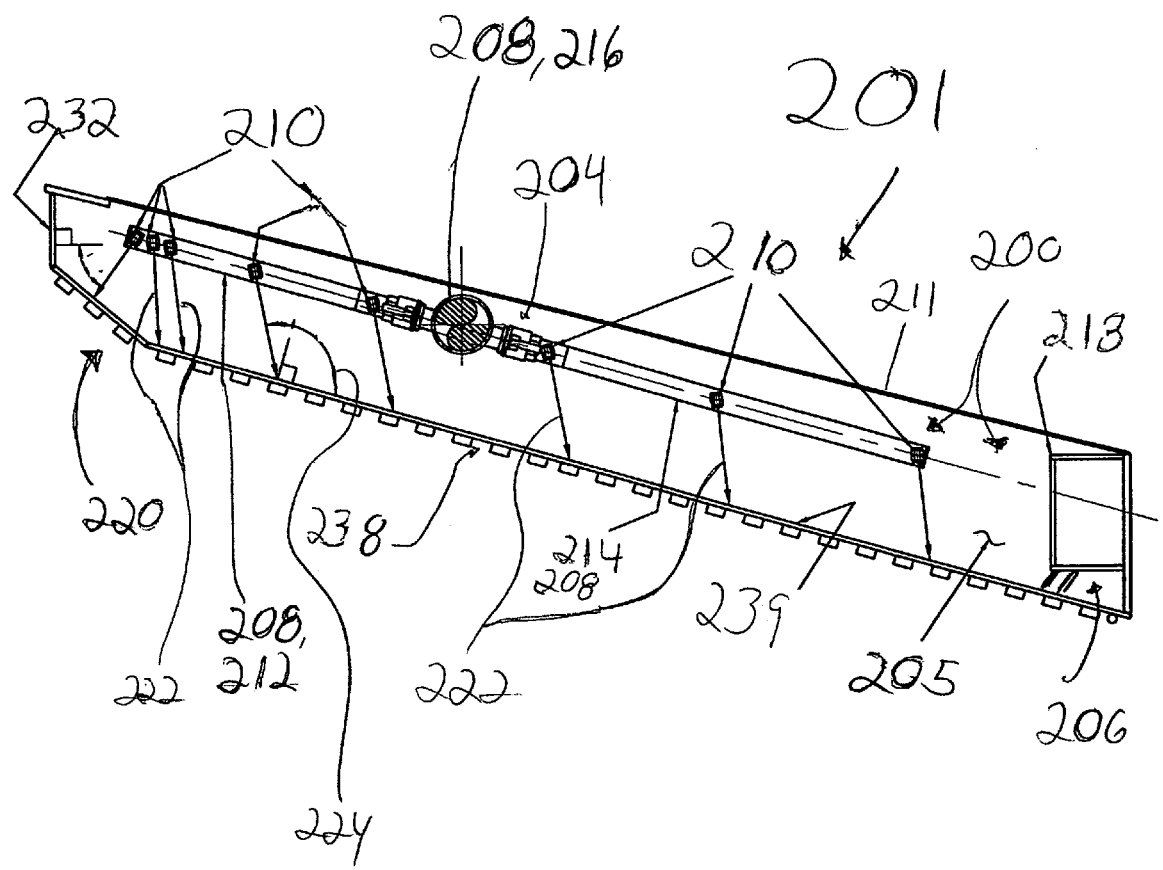
FIG. 5 is a partial cross-sectional elevation view of the roof of a metallurgical vessel including the improved cooling system.
Figure 6:
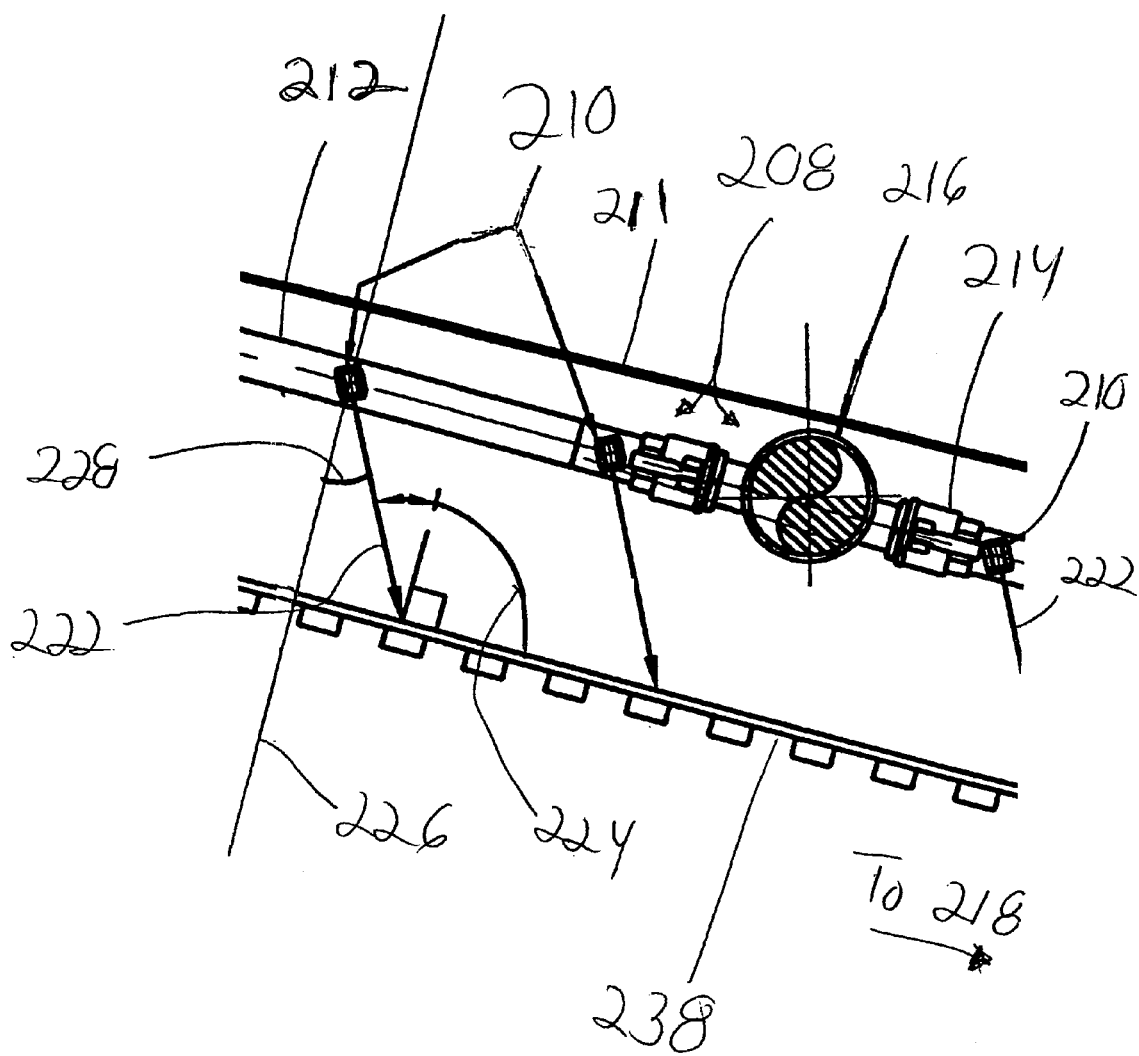
FIG. 6 is a detailed cross-sectional partial view of a section of the roof and cooling system positioned therein.
Figure 7:
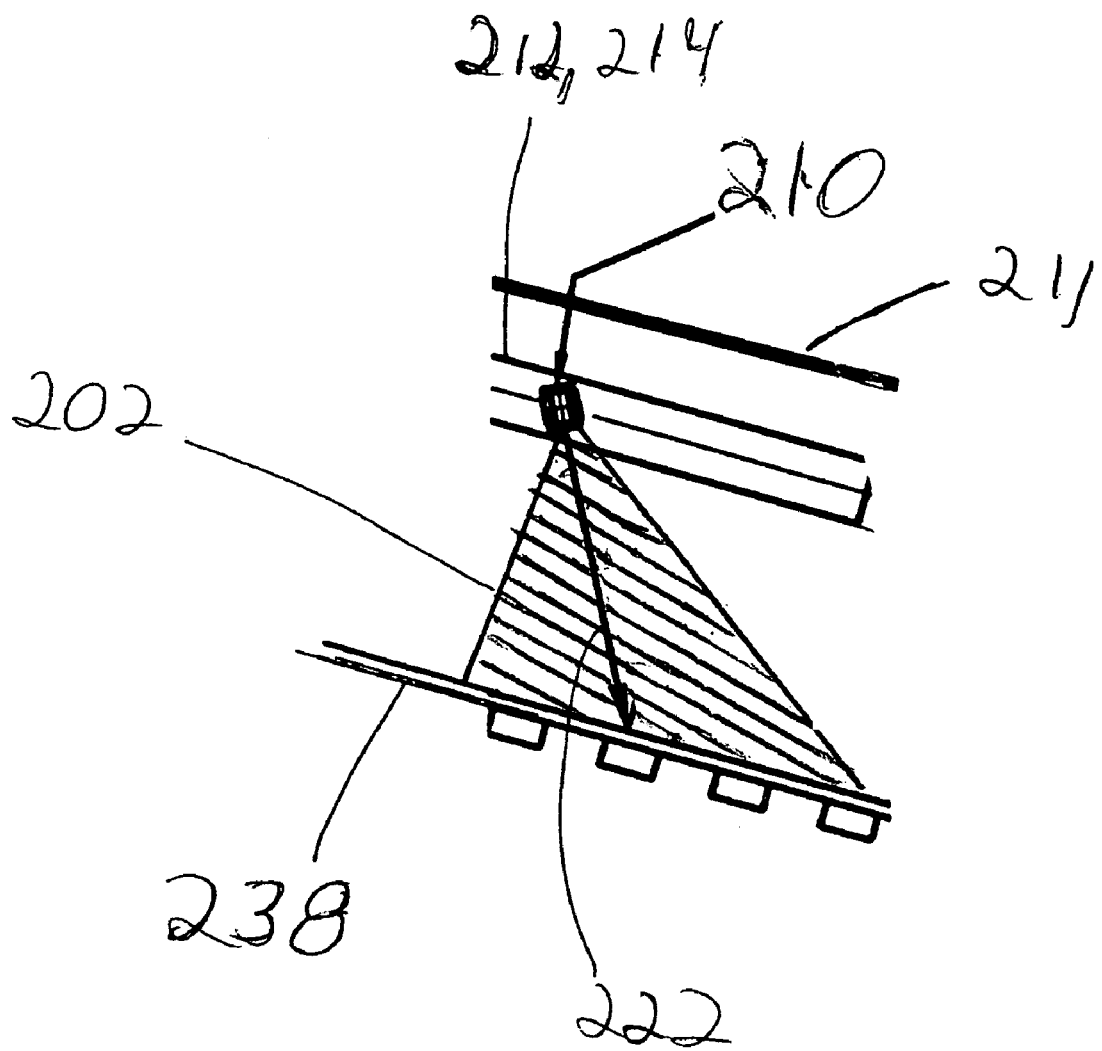
FIG. 7 is a detailed view of one of the distribution dispensers shown dispensing the fluid in a substantially conical shape.
Figure 8:
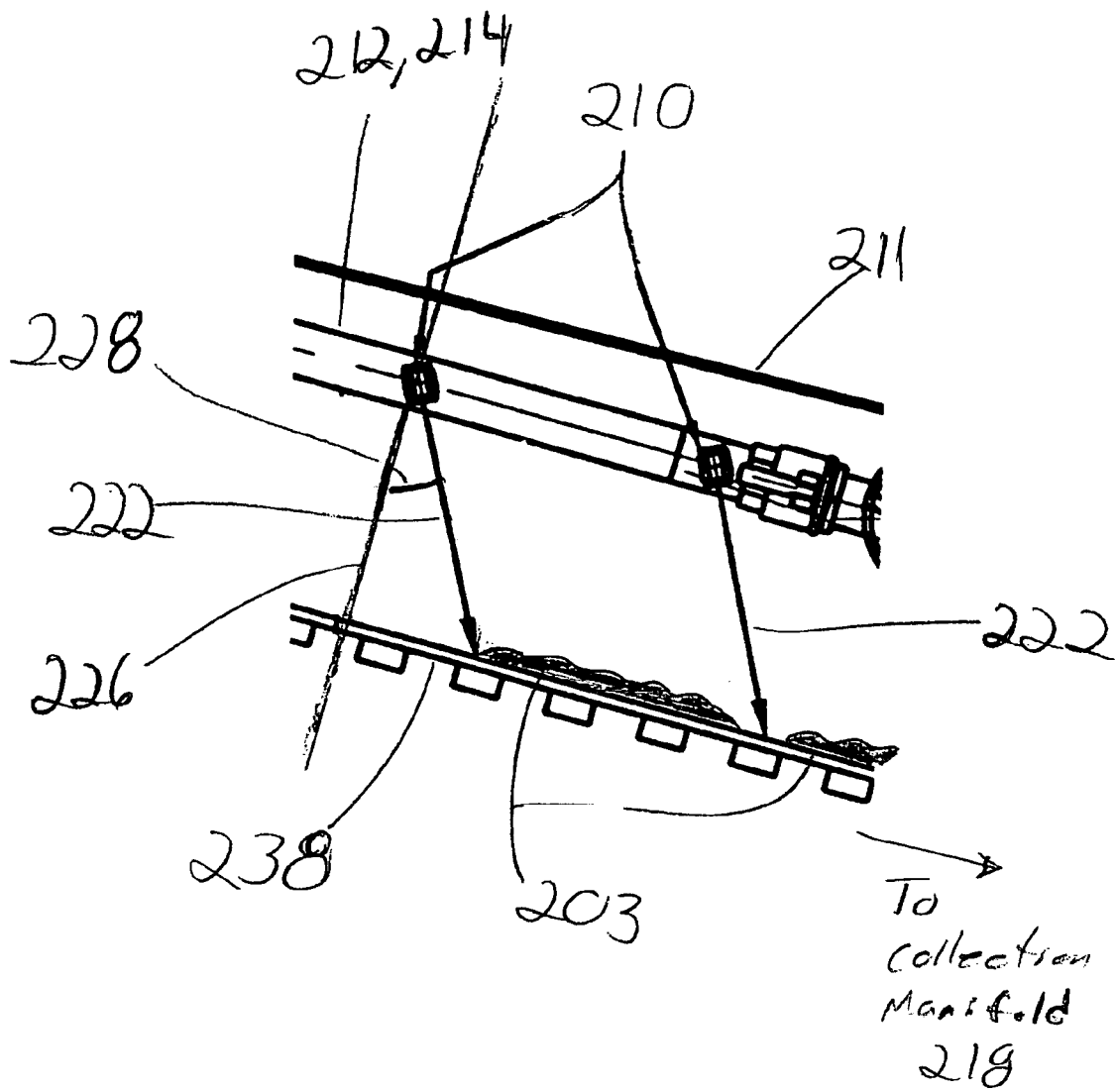
FIG. 8 is an additional detailed cross-sectional view of the distribution system showing the spent coolant being directed towards the collection manifold.

In a preferred embodiment the distribution dispensers (210) are positioned to direct the coolant (202) to intersect the inner surface (239) at an oblique angle (224) along a line of intersection (222). The line of intersection (222) is a line from each distribution dispenser (210) to the inner surface (239). The line of intersection (222) is preferably the center line of the distribution area of the fluid coolant (202) from the distribution dispensers (210), as seen in FIG. 7. The oblique angle (224) is an obtuse angle as measured from the line of intersection (222) towards the collection manifold (218), as seen in FIGS. 5 and 6.

Preferably the first header (212) and second header (214) are attached on substantially opposite sides of the intake manifold (216). As such the intake manifold (216) is positioned between the first header (212) and second header (214). Additionally, the second header (214) is vertically positioned below the first header (212). Preferably the intake manifold (216) is positioned substantially in the middle of the enclosed space (205). The first header (212) and second header (214) can be described as being attached to the intake manifold (216) in a substantially opposed alignment.

The distribution system (204) distributes coolant (202) against the inner plate (238) at a quantity sufficient for maintaining the inner surface (239) at a predetermined temperature. This predetermined temperature is a temperature that reduces the thermal stress upon the various surfaces of the metallurgical vessel (5). This predetermined temperature can be defined as a temperature that varies within a predetermined temperature range. Preferably, this temperature range is between 40 to 300 degrees Fahrenheit. More preferably, this temperature range is between 70 to 200 degrees Fahrenheit. Most preferably, this temperature range is between 100 to 150 degrees Fahrenheit.

The top (201) to the metallurgical vessel (5) includes at least one high heat region (220) located proximate to the opening (232) of the top (201). The intake manifold (216) is spaced from the high heat region (220) to facilitate the positioning of the distribution dispensers (210) to supply coolant (202) to the high heat region (220) at a proper trajectory. The repositioning of the intake manifold (216) allows for the proper directional alignment of the distribution dispensers (210) to facilitate the heat reduction of the inner plate (238).

Preferably the collection manifold (218) is peripherally positioned around the distribution system (204). Additionally, the collection manifold (218) is vertically positioned below a majority of the distribution system (204). The inner surface (239) also slopes towards the collection manifold (218). More specifically, the inner plate (238) slopes from the opening (232) to the collection manifold (218) to facilitate the gravitational flow of the previously discharged fluid (203) to the collection manifold (218).

Alternately, the distribution dispensers (210) can be described as being attached to at least one supply pipe (208) in an attachment plane (226). As such, each distribution dispenser (210) is positioned at an acute angle (228) as measured from the attachment plane (226) toward the collection manifold (218). Each distribution dispenser (210) is positioned at this acute angle (228) to direct the coolant (222) along the line of intersection (222) and toward the collection manifold (218). The positioning of the distribution dispensers (210) uses a majority of the kinetic energy contained within the fluid coolant (202) to control the flow of fluid coolant (202) away from the higher temperature location (220). Additionally, the positioning of the distribution dispensers (210) and the use of the majority of the kinetic energy contained within the fluid coolant (202) directs previously discharged fluid (203) away from the higher temperature location (220). As such, the distribution system (204) facilitates the heat transfer from the inner plate (238) to the coolant (202). Additionally, the distribution system (204) minimizes the collection of previously discharged fluid (203) and the circulation of unspent coolant (202) to the higher temperature location (220).

Preferably the spray nozzles (210) direct the coolant (202) to the lower panels (238) in a spray pattern. The spray pattern is substantially conical in shape and comprises droplets of coolant (202). The range of coverage by the conical shaped spray preferably extends approximately 55 degrees on either side of the center line (222) of the pattern as measured from the dispensing spray nozzle (220).

The positioning and the alignment of the spray nozzles (210) are designed such that the majority of the available kinetic energy in the fluid coolant (202) is not counter-productive to the gravitational flow of the spent coolant (203). As such, the alignment of the spray nozzles (210) directs the spent coolant (203), and the unspent coolant (202), outwardly towards the collection manifold (218) and away from the heat load region (220).

Figure 4:
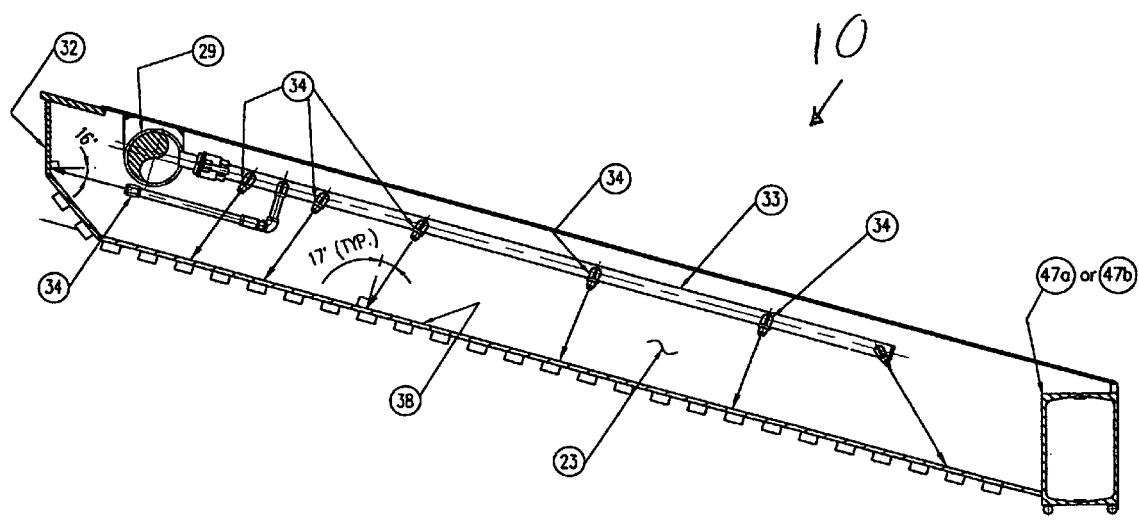
FIG. 4 is a partial elevation view of the roof 10 showing typical cross section of the prior art with nozzles 34 directed upwards at an angle of typically 17° from perpendicular.

In contrast, as depicted in FIG. 4, the prior art nozzles (34) are directed upward, typically at an angle of approximately 17 degrees from a line perpendicular to the lower plate (38), at the opening (32). As such, if the prior art nozzles (34) have a traditional full cone spray pattern approximately 65% of the available kinetic energy in the coolant of the prior art systems impedes or restricts the gravitational flow of the spent coolant towards the collection manifold.

Conversely, the spray nozzles (210) in the current invention are directed downward at an angle greater than zero as measured from a perpendicular line down from the dispenser to the closure elements (238 and 232). More preferably this angle measures from 10 degrees to 75 degrees and most preferably the angle ranges from 20 degrees to 45 degrees. As such the inventive distribution system (204) most preferably uses approximately 75% of the available kinetic energy to direct the spent coolant (203) in the direction of the gravitational flow of the coolant (202 and 203) towards the collection manifold (218).

Thus, although there have been described particular embodiments of the present invention of a new and useful Improved Furnace Cooling System and Method, it is not intended that such references be construed as limitations upon the scope of this invention except as set forth in the following claims.

All patents and publications described or discussed herein are hereby incorporated by reference in their entirety.

What is claimed is:

1. A cooling system for the distribution and collection of a fluid coolant in a metallurgical vessel used in the processing of molten materials, the cooling system comprising:
    a distribution system including an intake manifold, a plurality of headers attached to the intake manifold, and a plurality of distribution dispensers positioned along each header;
    a collection system including a collection manifold positioned to collect the fluid coolant;
    wherein the distribution dispensers are positioned to direct the fluid coolant toward the collection manifold and utilize the majority of the kinetic energy contained within the fluid coolant to direct the fluid coolant toward the collection manifold.

2. The cooling system of claim 1, wherein a first header and a second header is attached on substantially opposite sides of the intake manifold.

3. The cooling system of claim 2, wherein the second header is vertically positioned below the first header.

4. The cooling system of claim 1, wherein the metallurgical vessel includes a high heat region and the intake manifold is spaced from the high heat region.

5. The cooling system of claim 1, wherein the positioning of the majority of the distribution dispensers and the utilization of the majority of the kinetic energy contained within the fluid coolant directs previously discharged fluid coolant toward the collection manifold.

6. A metallurgical vessel used in the processing of molten materials comprising
    an inner plate including an interior surface;
    an outer plate spaced from the inner plate and defining a substantially enclosed space;
    a distribution system positioned within the enclosed space to distribute a kinetically energized fluid coolant to the inner plate, the distribution system including an intake manifold, a plurality of headers attached to the intake manifold, and a plurality of distribution dispensers positioned along each header;
    a collection system including a collection manifold for collection of the fluid coolant;
    wherein the distribution dispensers are positioned toward the collection manifold to use a majority of the kinetic energy contained within the fluid coolant to direct the fluid coolant toward the collection manifold.

7. The metallurgical vessel of claim 6, further including a line of intersection between each distribution dispenser and the inner surface wherein the distribution dispensers are positioned to direct the fluid coolant to intersect the interior surface at an oblique angle along the line of intersection.

8. The metallurgical vessel of claim 7, wherein the oblique angle is an obtuse angle as measured from the line of intersection toward the collection manifold.

9. The metallurgical vessel of claim 6, wherein the distribution system distributes the fluid coolant against the inner plate at a quantity sufficient for maintaining the inner plate at a predetermined temperature.

10. The metallurgical vessel of claim 6, wherein the positioning of the distribution dispensers and the use of the majority of the kinetic energy contained within the fluid coolant directs previously discharged fluid coolant toward the collection manifold.

11. The metallurgical vessel of claim 6, wherein:
the collection manifold is peripherally positioned around the distribution system;
the collection manifold is vertically positioned below a majority of the distribution system; and
the inner surface slopes toward the collection manifold.

12. The metallurgical vessel of claim 6, wherein a first header and a second header are attached to the intake manifold in a substantially opposed alignment.

13. The metallurgical vessel of claim 6, wherein the intake manifold is positioned between a first header and a second header.

14. The metallurgical vessel of claim 6, wherein the intake manifold is positioned substantially in the middle of the enclosed space.

15. A metallurgical vessel used in the processing of molten materials, the metallurgical vessel comprising
a proximate plate including an interior surface;
a distal plate spaced from the proximate plate and defining a substantially enclosed space;
a distribution system positioned within the enclosed space to distribute a kinetically energized fluid coolant to the proximate plate, the distribution system including a plurality of supply pipes and a plurality of distribution dispensers positioned along the supply pipes;
a collection system including a collection manifold for collection of the fluid coolant; and
wherein the distribution dispensers are positioned to direct the fluid coolant along a line of intersection that intersects the interior surface at an obtuse angle as measured from the line of intersection toward the collection manifold.

16. The apparatus of claim 15, wherein the positioning of the distribution dispensers uses a majority of the kinetic energy contained within the fluid coolant to direct the fluid coolant toward the collection manifold.

17. The apparatus of claim 16, wherein the positioning of the distribution dispensers and the use of the majority of the kinetic energy contained within the fluid coolant directs previously discharged fluid coolant toward the collection manifold.

18. A metallurgical vessel used in the processing of molten materials comprising
an inner plate including a higher temperature region;
a distribution system positioned proximate to the inner plate to distribute a kinetically energized fluid coolant to the inner plate, the distribution system including at least one supply pipe and a plurality of distribution dispensers attached to the at least one supply pipe in an attachment plane;
a collection system including a collection manifold positioned to collect the fluid coolant;
wherein the distribution dispensers are positioned at an acute angle as measured from the attachment plane toward the collection manifold to direct the fluid coolant along a line of intersection; and
wherein the positioning of the distribution dispensers uses a majority of the kinetic energy contained within the fluid coolant to control the flow of fluid coolant away from the higher temperature region.

19. The apparatus of claim 18, further including a line of intersection between the distribution dispensers and the inner plate, the line of intersection intersecting the interior surface at an obtuse angle as measured from the line of intersection toward the collection manifold to the surface of the inner plate.

20. The apparatus of claim 18, wherein the distribution system distributes the fluid coolant against the inner plate at a quantity sufficient for maintaining the inner plate at a predetermined temperature.

21. The apparatus of claim 18, wherein the positioning of the distribution dispensers and the use of the majority of the kinetic energy contained within the fluid coolant directs previously discharged fluid coolant away from the high temperature region.

* * * * *